[15] 3,658,131

Biles

[45] Apr. 25, 1972

[54] SELECTIVE PLUGGING METHOD

[72] Inventor: Jerry W. Biles, Tulsa, Okla.

[73] Assignee: Cities Service Oil Company

[22] Filed: Oct. 30, 1970

[21] Appl. No.: 85,741

Related U.S. Application Data

[63] Continuation-in-part of Ser. No. 812,302, Apr. 1, 1969, abandoned.

[52] U.S. Cl. ............................................. 166/292, 166/273
[51] Int. Cl. .................................. E21b 33/138, E21b 43/22
[58] Field of Search ................... 166/270, 274, 273, 292, 300

[56] References Cited

UNITED STATES PATENTS

| | | | |
|---|---|---|---|
| 1,421,706 | 7/1922 | Mills | 166/300 UX |
| 2,001,350 | 5/1935 | Mills | 166/300 |
| 2,042,011 | 5/1936 | Loomis | 166/292 |
| 2,747,670 | 5/1956 | King et al. | 166/270 |
| 2,920,041 | 1/1960 | Meadors | 166/274 X |
| 3,175,611 | 3/1965 | Hower | 166/292 |
| 3,342,262 | 9/1967 | King et al. | 166/300 UX |
| 3,522,844 | 8/1970 | Abdo | 166/270 |
| 3,530,937 | 9/1970 | Bernard | 166/270 |

*Primary Examiner*—Stephen J. Novosad
*Attorney*—J. Richard Geaman

[57] ABSTRACT

The more permeable channels in an oil producing formation are selectively plugged by the reaction in the formation of sodium silicate and a divalent cation-containing brine present in the formation. The sodium silicate reactant is separated from the formation brine by an inert spacing medium so that the precipitate is formed at a desired distance from the injection wellbore. The reactants may be caused to contact each other over a larger region of the formation by decreasing the amount of spacing medium employed during the introduction of the treating solutions.

7 Claims, No Drawings

SELECTIVE PLUGGING METHOD

This application is a continuation-in-part of application Ser. No. 812,302, filed Apr. 1, 1969, now abandoned.

BACKGROUND OF THE INVENTION

The invention relates to a method for increasing the recovery of oil from subterranean oil producing formations. More particularly, it relates to an improved method for selectively adjusting the permeability of such oil producing formations.

During the flow of oil into a production well positioned in an oil producing formation, an undesirable flow of connate water, or brine, into the production well is commonly experienced. The production of this water reduces the rate of oil production, burdens the necessary recovery equipment, and contaminates the product obtained from the production well. When the ratio of water to oil exceeds an economic limit, further production from that well is essentially precluded.

This production of water accompanies the production of oil resulting from its natural driving pressures and from the use of secondary recovery techniques. In the secondary recovery of oil after natural drives have become exhausted or reached the point of economic depletion, a driving means is injected into the formation in order to force or encourage the movement of the residual oil in a direction generally away from the injection well toward the production well. Such secondary recovery techniques commonly employed include water floods and gas drives, in which water or gas is injected under pressure so that it will move outwardly from the injection well, building up before it and moving a band of in-place oil toward the production well.

It is generally recognized that such secondary recovery techniques are incapable of recovering substantially all of the oil present in the oil bearing formation. The so-called irreducible oil saturation in a strata of substantially constant permeability after a secondary water flooding operation may be from about 20 percent to 30 percent of the original oil saturation. In addition, the amount of oil recovery is reduced by variations in the permeability of the strata. Such variations, it is well recognized, result in a tendency of the driving fluid to channel through the more permeable areas of the formation. As a result, the oil in the relatively less permeable areas of the strata tend to be by-passed.

As the driving fluid follows the more permeable channels in the strata, a portion of the residual oil in these regions will be recovered. As the secondary recovery operation is continued, however, the production of the driving fluid will increase and the percentage of the rock porosity occupied by oil will decrease as more and more of the driving fluid sweeps through the more permeable and partially depleted channels in the strata. Eventually, the driving fluid to oil production ratio reaches a point where the secondary recovery process becomes economically undesirable. In conventional water flood operations, the maximum water to oil ratio is normally about 100 barrels of produced water per barrel of oil. It is, of course, desirable to operate at much lower water to oil ratios, with 5 to 10 barrels of water per barrel of oil being generally considered as an acceptable operating condition.

In an effort to maintain tolerable driving fluid to oil ratios, it has been proposed that the permeability of the oil bearing strata be controlled or adjusted to provide the greater uniformity of strata necessary to overcome the undesirable channeling of the driving fluid. Such an adjustment has as its general object the selective plugging of the more permeable channels in the formation in order to divert the driving fluid into the less permeable channels that are by-passed when the driving fluid exhibits the tendency to channel. This attempt to selectively adjust the permeability of oil producing formations, therefore, not only tends to improve the driving fluid to oil ratio so as to extend the life of the secondary recovery operation, but also tends to increase the ultimate recovery of oil from the formation, thus reducing the amount of oil left unrecovered by the secondary recovery operation.

Numerous techniques have been proposed in the art for selectively adjusting the permeability of oil producing formations. These techniques generally provide for the formation of a precipitate or other plugging material in the relatively more permeable channels of the formation. Such techniques include those in which a treating material is injected into the formation for reaction with the brine present in the formation. Thus, a soap solution, lead nitrate, rubber latex and surfactants had been proposed for injection into the formation to form precipitates with the brine in the more permeable channels of the formation. Water insoluble hydroxides have similarly been formed by the reaction of alcoholates of a metal with the formation waters.

It has also been proposed that the oil-bearing formation be treated with reactants that, upon contact within the permeable strata, will form one or more precipitates that will obstruct the more permeable pores, thus selectively reducing the porosity and the permeability of such regions of the formation. Such techniques are illustrated by the method described in U.S. Pat. 2,807,324. As disclosed therein, two oil-insoluble solutions containing chemically active components are introduced into an oilbearing formation through an injection well positioned therein. In order to position the double precipitate that forms upon contact of these reactants at some desirable distance from the injection wellbore, the reactants are separated by an inert spacing medium. In order to achieve the desired selective plugging in a greater region of the producing formation, the cyclic introduction of the reactants, together with a decreasing amount of spacing medium, was proposed in U.S. Pat. No. 3,342,262. In accordance with this technique, the reactants are driven into the formation until they contact each other in concentric regions of the formation increasingly approaching the injection wellbore. In these processes, therefore, it is a necessary requisite that the reactants be driven by the further introduction of fluid into the wellbore until they contact one another and form the desired plug.

While the techniques hereinabove described have generally been satisfactory in achieving some measure of selective permeability adjustment, their use has not been entirely satisfactory due to the cost of the reactants employed in these various techniques. It will be appreciated that relatively large quantities of reactants are required in order to achieve a sufficient plugging of the more permeable channels to significantly divert the flow of the driving fluid into the relatively less permeable areas of the formation. In the absence of such an appreciable plugging action, the amount of additional oil recovery would not be sufficient to justify the cost involved in the plugging operation. There is a continuing interest in the field, therefore, in improved selective plugging techniques. Such improvements would embrace the placement of more effective plugging materials, as well as the injection of relatively less expensive reactants to accomplish the desired plugging action. By employing relatively effective but less expensive reactants, it becomes less expensive to perform a plugging operation of sufficient magnitude to appreciably effect the water to oil ratio and the ultimate recovery from the producing formation.

It is an object of this invention, therefore, to provide an improved process for the recovery of oil from subterranean oil-bearing formations.

It is another object of this invention to provide an improved process for selectively adjusting the permeability of oil producing formations.

It is another object of this invention to provide a selective plugging process suitable for the deposition of precipitates in the more permeable channels of an oil producing formation.

It is a further object of this invention to provide a selective plugging process in which the relative cost of the precipitate-forming reactants is minimized.

With these and other objects in mind, the present invention is hereinafter described, the novel features thereof being particularly pointed out in the appended claims.

SUMMARY OF THE INVENTION

The objects of the invention are accomplished by the reaction of a sodium silicate solution with a divalent cation-containing brine in the more permeable channels of an oil producing formation. Such brines will commonly contain chlorides of alkaline earth materials, such as calcium chloride. Thus, many of the brines ordinarily found in producing formations are employed as one of the reactants in the selective plugging process of this invention. As the second reactant, the present invention calls for the use of a relatively inexpensive sodium silicate solution.

In order to place the precipitate formed upon contact of the reactants at a desirable distance from the injection wellbore, an inert spacing medium, such as fresh water, is injected to separate the sodium silicate solution from the brine. The reactants may also be injected into the formation in cycles, with each cycle containing of a portion of the treating reactants separated by inert spacing medium. Produced brine from the formation is reinjected as the brine reactant of the present invention. In order to increase the area of the formation over which the desired precipitate is formed, the amount of spacing medium may be reduced during the treating operation, thereby causing the plugging precipitate to come out of solution nearer the wellbore. The reactants are contacted by resuming the normal flooding operations so that they are comingled by the drive forces of the flooding medium.

Due to the formation of precipitates selectively in the permeable regions of the formation in which channeling occurs, flood waters or gases subsequently injected into the wellbore as the driving fluids in secondary recovery operations are diverted into those less permeable regions that would ordinarily be by-passed because of the tendency of the driving fluid to follow the more permeable channels from the injection wellbore to the production well. Production wells may be similarly treated by the process of this invention.

DETAILED DESCRIPTION OF THE INVENTION

The selective plugging operation of the present invention is accomplished by the contact of sodium silicate with a divalent cation-containing brine in the more permeable channels of the formation. For the purposes of the present invention, any suitable sodium silicate solution may be readily employed. For example, "N" sodium silicate solution may be readily employed. For example, "N" sodium silicate, a commercial grade of sodium silicate, may conveniently be employed. The concentration of the sodium silicate solution is not a critical feature of the invention, and any convenient concentration, such as from about 10 percent to about 20 percent by weight sodium silicate, can conveniently be employed, although concentrations outside this range are also within the scope of this invention.

While the exact nature of the plugging material or materials has not been determined, it is necessary that the sodium silicate solution contact a brine containing divalent cation-containing salts. Such salts will normally comprise chlorides of alkaline earth metals, such as calcium chloride. While the treating solution employed may contain such divalent cation-containing salts as its principal ingredient, it is not necessary that such divalent cation-containing salts be the principal or major components of the treating solution. To the contrary, such divalent cation-containing salts are frequently found in formation brines that contain a major portion of monovalent cation-containing salts, such as sodium chloride, and a relatively minor amount of the desired divalent salts. Such brines can be effectively used in the present invention, and, in fact, will ordinarily constitute a preferable treating solution because of their ready availability in the formation. A typical brine found in the formation, for example, will commonly contain about 25 grams of sodium chloride per liter and about 2.5 grams per liter of calcium chloride.

Since the brines containing divalent salts are obtained from the subterranean oil producing formation, it is possible to achieve the selective permeability adjustment herein described by the injection of the sodium silicate solution into the oil bearing formation containing such divalent cation-containing salts. For greater control over the placement and degree of selective plugging action, however, it has also been found desirable to inject both the sodium silicate and the divalent cation-containing brine into the formation in question as separate treating solutions. The use of an inert spacing medium between the two treating solutions is required to permit the movement of the treating solutions into the formation in the direction of the production well to avoid plugging off the injection wellbore which would be possible with the absence of such a spacing medium as the reactants would tend to set up and plug immediately in the vicinity of the injection wellbore. The effectiveness of the plugging materials formed upon contact of the reactants will generally be greater, and the subsequent oil recovery enhanced, when the plugging action occurs at a point removed from the immediate vicinity of the injection wellbore. For this reason, it is generally preferred that the reactants be injected into the formation in slugs, the slugs being separated by an inert spacing medium. While the inert spacing medium may be any suitable liquid that does not react with or adversely effect the treating slugs it is intended to separate, the use of fresh water will generally be satisfactory and the most convenient for this purpose. As is well known in the art, as the treatment slugs and the inert spacing medium pass outwardly from the injection wellbore, thickness of the spacing medium will gradually decrease so that at some point removed from the injection wellbore the reactants will come into contact.

It is also within the scope of the present invention, and preferred, to inject the treating solutions into the formation in cycles. In this embodiment, each cycle consists of, in succession, a slug of one reactant, a slug of spacing medium, a slug of a second reactant, and a slug of spacing medium. When the amounts of spacing medium are maintained relatively constant during the succeeding treating cycles, the plugging material is generally built up gradually in a particular region of the oil producing formation. Further advantages have been found in decreasing the relative amount of inert spacing medium employed as the treating operation progresses. In this embodiment, the plugging precipitate is placed nearer and nearer the injection well as the relative amount of spacing medium is decreased. The plugging action will, of course, continue to occur in the generally more permeable channels of the formation. A relatively large area of the strata surrounding the injection well may be covered in this manner, so as to cause the subsequent driving fluid to be diverted into regions of relatively low permeability in the producing formation. In this manner, the so-called sweep efficiency of the subsequent secondary recovery operation will be enhanced, as the plugging solutions tend to enter in the more permeable strata of the formation in which plugging is desired, so as to improve the water to oil ratio at the production well and to reduce the amount of oil unrecovered in such secondary recovery operations.

While the amount of reactants employed does not constitute an essential feature of this invention, it will be appreciated that a sufficient quantity of reactants should be employed in order to achieve a significant amount of plugging action. The amount of the reactants employed in any particular application will depend upon a variety of factors, such as the porosity characteristics of the formation, the severity of the channeling that occurs, the existing oil production rate, the anticipated overall oil recovery from the formation, the existing water to oil performance of the production well or wells, the concentration of divalent cation of the brine contained within the formation and the like. Generally, in the cyclic process, the quantity of divalent cation-containing brine employed will be determined so as to provide the stoichiometric quantity of divalent salts necessary for reaction with the amount of sodium silicate injected, in light of the factors indicated above, and generally will constitute the produced brine separated from the oil produced from the production well. This brine may be conditioned by the addition of salts thereto.

As is well known in the art, the surface pressure employed during the injection of the treating liquids is generally regarded as a measure of the effectiveness of the plugging operation. As the more permeable channels of the formation are at least partially plugged upon contact therein of the treating solutions, the injection pressure necessary to force additional quantities of the treating solutions into the formation will necessarily increase. The plugging operation may be continued, using the injection pressure as a control, until the limit of the existing surface facilities has been reached, while remaining below the injection pressure at which fracturing of the formation would occur. Such fracturing is, of course, undesired at this stage of an overall secondary recovery operation since the fracture would create a more permeable channel through the formation and thwart the purposes of the selective plugging operation. The particular advantage of the cyclic system with a diminishing amount of spacer comprising produced brines and fresh sodium silicate solution, is that this improvement may be achieved and enhanced by the use of economic amounts of the treating reactants while increasing this distance in the highly permeable flow path which is plugged. By increasing the length of plugged portion of the highly permeable flow path, the possibility of injection water bypassing the plug and returning to the highly permeable flow path is minimized.

The following example is given in order to further illustrate the practice of the present invention and is not intended to limit the scope of the invention as described herein and as set forth in the appended claims.

In this example, a ¾-inch diameter pipe 9 feet long was horizontally mounted and provided with suitable connections to permit the introduction of fluids thereto. The pipe was packed with dolomite chips and was flushed with fresh water and conditioned with an ordinary brine containing 25 grams/liter sodium chloride and 2.5 grams/liter of calcium chloride. The thus-prepared core was subjected to a number of treating cycles in a selective plugging operation in accordance with the teaching of the present invention. Each cycle consisted of the injection into the core of a slug of sodium silicate solution and a slug of divalent cation-containing brine separated by a fresh water spacer. Further details concerning the treating cycles are as set forth in Table 1. The sodium silicate solution employed was a 10 percent by weight solution of "N" sodium silicate, a commercial silicate. The brine employed was an ordinary brine have 25 grams/liter sodium chloride and 2.5 grams/liter calcium chloride, typical of a natural formation brine.

TABLE I

| Treatment Cycle | Volume of Treatment Slug (ml) | | | |
|---|---|---|---|---|
| | Silicate | Fresh Water | Brine | Fresh Water |
| 1 | 50 | 50 | 50 | 800 |
| Core Plugged—Flow then Restored | | | | |
| 2 | 50 | 250 | 50 | 250 |
| 3 | 50 | 250 | 50 | 250 |
| 4 | 50 | 250 | 50 | 250 |
| 5 | 50 | 250 | 50 | 250 |
| 6 | 50 | 250 | 50 | 250 |
| 7 | 50 | 1500 | – | – |

The permeability of the core was measured before the selective plugging treatment was commenced and after each treating cycle. Those measurements and the results thereof are set forth in Table II.

TABLE II

| | Net minutes | Net ml. water | Ml./ min. | Pressure drop [2] | Permeability (darcies) |
|---|---|---|---|---|---|
| Prior to treatment | 0 | 0 | 0 | 4.5 | |
| | 7 | 96 | 13.7 | 4.5 | 1.960 |
| Following cycle 1 | | | 0 | 72 | [1] |
| | Flow restored | | | | |
| Prior to Cycle 2 | 0 | 0 | | 34 | |
| | 6 | 93 | 15.5 | 34 | 294 |
| | 0 | 0 | | 72 | |
| | 14 | 96 | 6.9 | 72 | 62 |
| Following next 5½ cycles | Core treated with 850 ml. brine | | | | |
| | 0 | 0 | | 72 | |
| | 11 | 80 | 7.3 | 72 | 72 |

[1] No flow.
[2] Inches of water.

As shown by the results of the first treating cycle, the use of a relatively small amount of spacer resulted in a rapid and concentrated plugging of the core to the point of completely blocking flow in the core. In the subsequent 5 ½ treating cycles in which a larger amount of spacer was employed, a plugging material was gradually built up so as to reduce the permeability of the core from 294 to 62 darcies. A subsequent waterflood with 850 ml. of brine, a typical flooding medium, caused a slight breakthrough in the more permeable channels of the core. This effect was of limited significance, however, causing the permeability to increase only to 72 darcies.

The present invention, as herein described and illustrated, readily permits the selective adjustment of the permeability of oil producing formations by the use of natural formation brines as one reactant solution. Such adjustment, by plugging the more permeable channels of the formation, causes the driving fluid employed in subsequent secondary recovery operations to pass into and through the less permeable areas of the formation. Thus, the water to oil ratio at the production well may be improved and the total amount of oil recovered from the treated formation may be increased.

In accomplishing these desirable results, the present invention further enhances the economic value of the plugging operation by the utilization of low cost treating materials. By employing sodium silicate and already present formation brine, the overall cost of performing the selective plugging operation is minimized. Selective plugging is thereby made a more economically feasible technique than has often been the case with existing plugging technology. The present invention, therefore, offers distinct advantages that permit or encourage improved production performance and greater recovery from oil producing formations.

The present invention has been described herein with respect to certain embodiments thereof. It will be appreciated by those skilled in the art, however, that various changes and modifications can be made therein without departing from the spirit and scope of the invention as set forth in the appended claims.

Therefore, I claim:

1. A method of selectively adjusting the permeability of oil producing formations containing a divalent cation-containing brine, for improved flooding operations, by the reaction of precipitate-forming reactants in the formation in the vicinity of undesired flow, said method comprising:
   a. introducing an inert spacing medium into the formation;
   b. subsequently introducing a sodium silicate solution into the divalent cation-containing brine formation;
   c. injecting flooding medium to contact the sodium silicate solution and the divalent cation-containing brine and form a precipitate in the more permeable channels of the formation.

2. The method of claim 1 in which said brine contains calcium chloride.

3. The method of claim 2 in which said inert spacing medium comprises fresh water.

4. The method of claim 1 further comprising injecting sodium silicate, inert spacing medium, produced formation brine and a second slug of inert spacing medium into the formation in cycles before injection of the flooding medium.

5. The method of claim 4 in which the amount of brine slug injected is sufficient to provide the stoichiometric amount of divalent cation for reaction with said sodium silicate.

6. The method of claim 5 in which the relative amount of inert spacing medium employed is decreased during the treatment operation so that the reactants will contact each other in concentric regions of the formation increasingly approaching the injection well, whereby the precipitates are deposited in a heavy concentration in the more permeable channels of a relatively large area of the strata surrounding the injection well.

7. The method of claim 6 in which the inert spacing medium comprises fresh water.

* * * * *